June 22, 1965 P. B. KING, JR 3,190,975

MULTIPLE KEY SWITCHBOARD

Filed Nov. 3, 1960 3 Sheets-Sheet 1

INVENTOR

PAUL B. KING, JR.

BY Mead, Browne, Schuyler & Beveridge

ATTORNEYS

June 22, 1965 P. B. KING, JR 3,190,975

MULTIPLE KEY SWITCHBOARD

Filed Nov. 3, 1960 3 Sheets-Sheet 2

INVENTOR

PAUL B. KING, JR.

BY Mead, Browne, Schuyler & Beveridge

ATTORNEYS

June 22, 1965 — P. B. KING, JR — 3,190,975

MULTIPLE KEY SWITCHBOARD

Filed Nov. 3, 1960 — 3 Sheets-Sheet 3

INVENTOR

PAUL B. KING, JR.

BY *Mead, Browne, Schuyler & Beveridge*

ATTORNEYS 3,190,975
MULTIPLE KEY SWITCHBOARD

Paul B. King, Jr., Mountain Lakes, N.J., assignor to Aircraft Radio Corporation, Boonton, N.J., a corporation of New Jersey Filed Nov. 3, 1960, Ser. No. 66,977
5 Claims. (Cl. 200—1)

This invention relates to an electrical switchboard and more particularly to a switchboard for use with high frequency potentials.

In the field of communications including the field of electronics there arise situations in which it is desirable to use a plurality of high frequency potentials. Because of the electro-magnetic and electro-static fields associated with such potentials, it is necessary to shield the individual conductors carrying these potentials to prevent interference between each other and also with other components in the system. In situations where it is necessary to switch from one frequency to another, switchboards are employed in which the various conductors are individually shielded as well as are the respective switching units. This results in bulky configurations of components which require excess assembly time as well as an excess number of components.

It is a major object of this invention to provide an improved multiple key switchboard for high frequency potentials having a minimum of shielding components for easy assembly.

It is a further object of this invention to provide an improved switchboard for high frequency potentials wherein any one of a plurality of frequencies may be quickly connected to any one of a plurality of output circuits.

To accomplish the objects of this invention, a major feature resides in the switchboard structure which comprises a housing of a conductive material and a circuit board having shielding material overlying both of its faces and being supported within the housing to carry a plurality of contact elements mounted in rows of spaced apertures arranged in alternately offset columns, the contact elements in the alternate columns being connected together, the contact elements other than those in the alternate columns being connected together to form alternate rows, a plurality of plungers having contact members extending radially from one end to overlie a contact element in one of the alternate columns and a contact element in one of the alternate rows to engage and connect them together upon movement of any one of said plungers toward the board. The device is essentially a crossbar switch for high frequency potentials in which the shielding between the respective channels is an integral part of the switch structure so that additional shielding of the individual conductors is not required. Elimination of such additional shielding provides a multi-key switch structure which is compact and easy to assemble.

These and other objects, advantages and features of the invention will become apparent from the following specification taken in conjunction with the drawings wherein.

Figure 2:
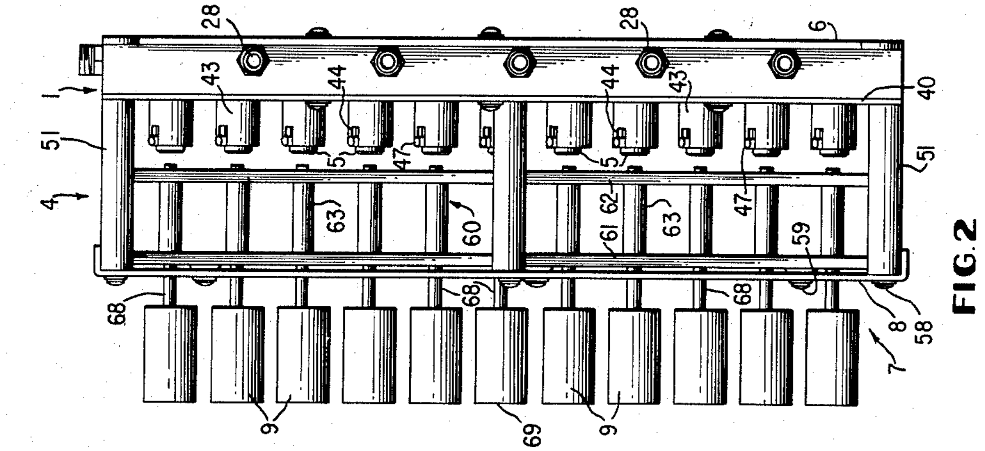
FIG. 2 is a side elevation of the switchboard shown in FIG. 1.
Figure 1:
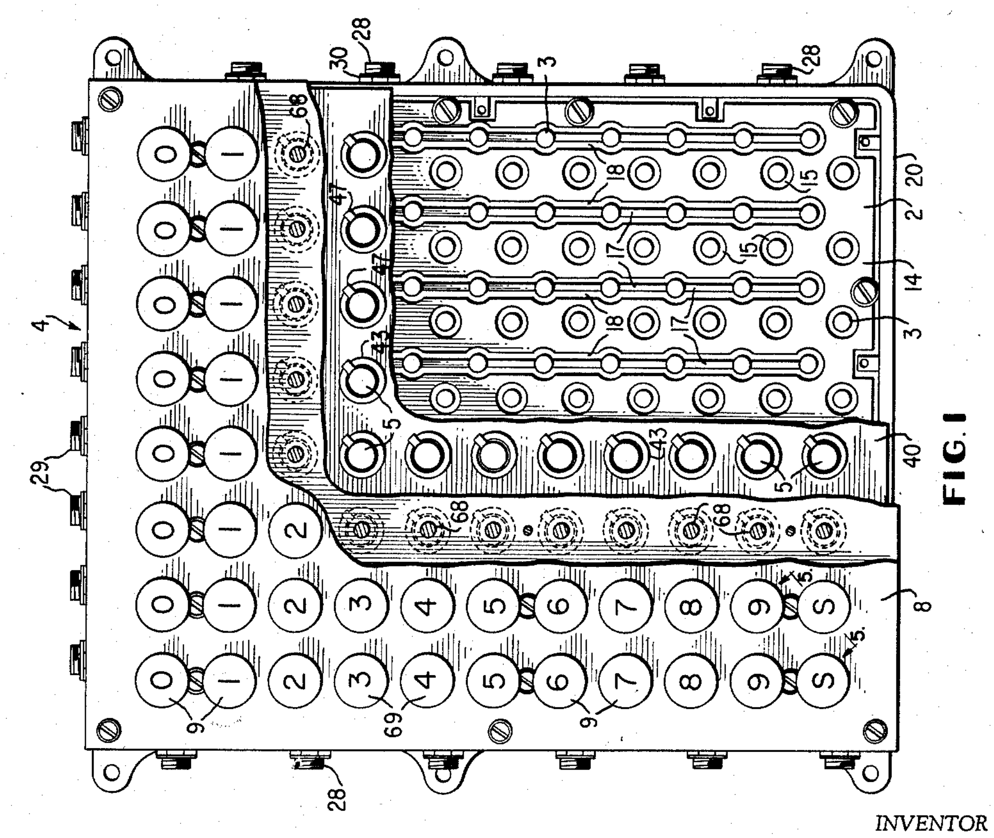
FIG. 1 is a plan view of a switchboard embodying the invention in its present form with some parts broken away.
Figure 4:
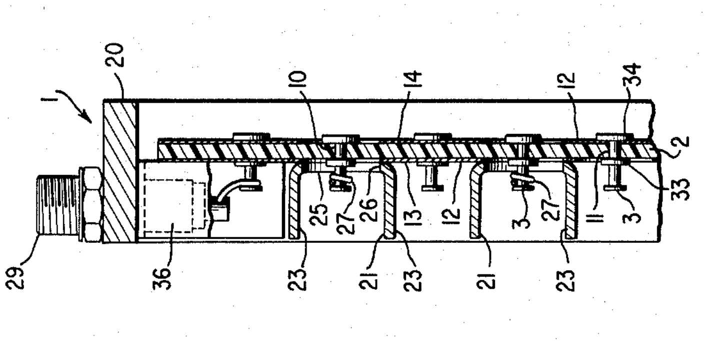
FIG. 4 is an enlarged sectional view taken on the line 4—4 of FIG. 3.
Figure 3:
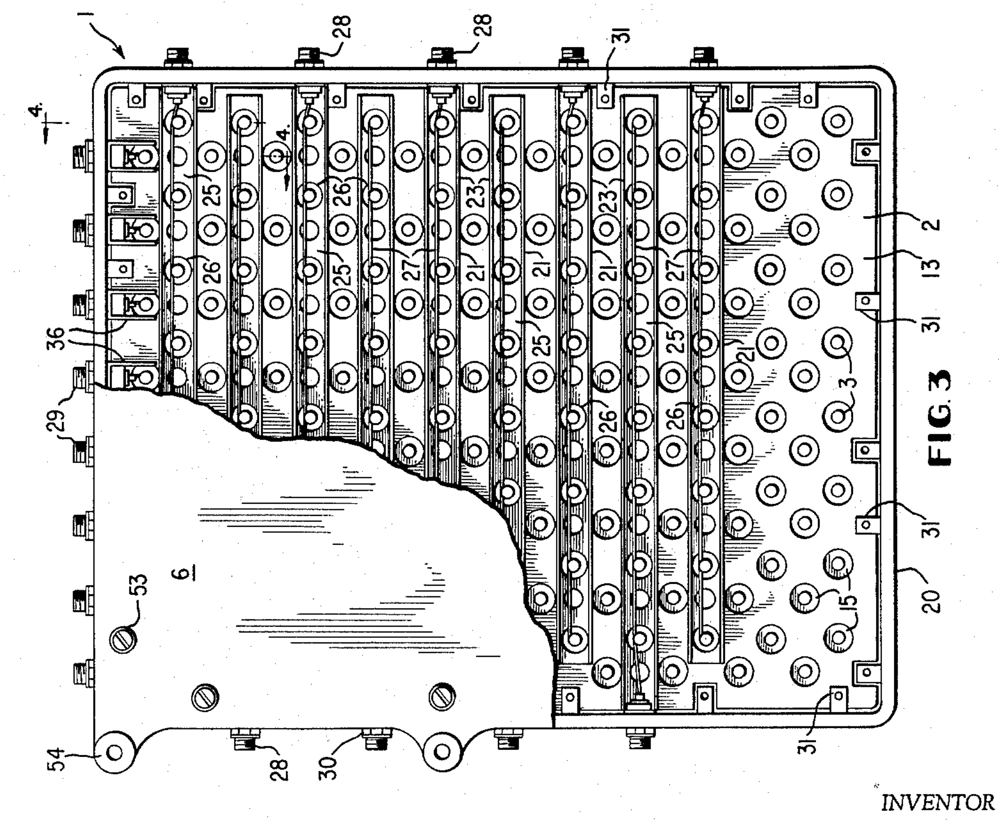
FIG. 3 is a bottom view of the switchboard shown in FIG. 1 with the cover plate broken away.
Figure 7:
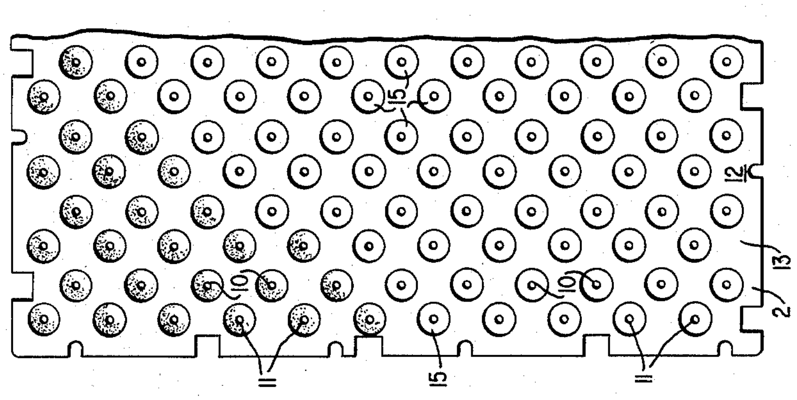
FIG. 7 is a fragmentary view of the under side of the board shown in FIG. 6.
Figure 6:
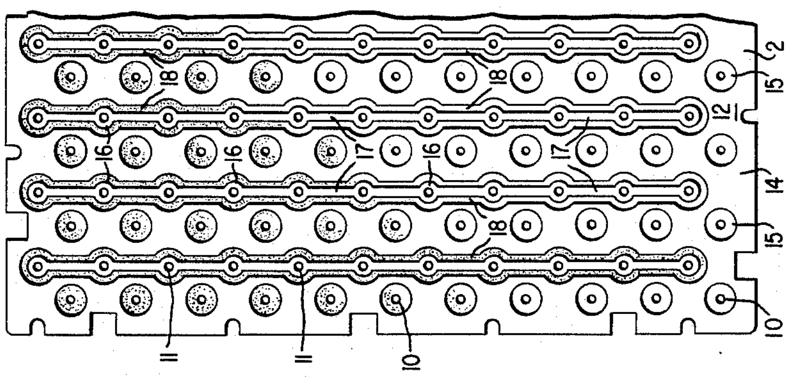
FIG. 6 is a fragmentary view of the printed circuit board shown in FIG. 1.
Figure 5:
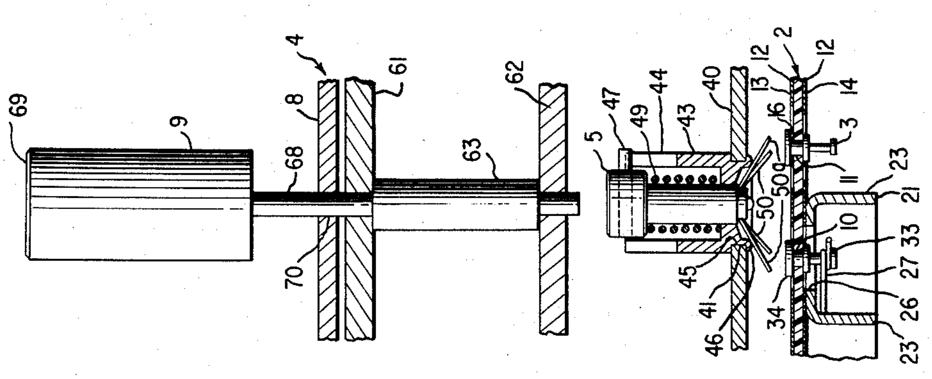
FIG. 5 is an enlarged view of one of the push buttons and switch points with some parts in section.

Referring to the drawings, the structure embodying the invention includes frame assembly 1 in which is mounted printed circuit board 2 containing contact elements 3. Plate assembly 4 is mounted over the front of frame assembly 1 to the support plungers 5 for slidable engagement with contact elements 3 and also to support switch assembly 7 on plate 8 for support and guidance of plunger actuating knobs 9.

Circuit board 2 which is of a dielectric material is formed with a plurality of rows (22 in number) of spaced apertures 10 and 11 with the apertures 10 arranged in eight columns which are alternately offset from a similar eight columns in which apertures 11 are arranged, there being 176 apertures in total. Overlying rear face 13 and front face 14 of circuit board 2 are thin layers of conductive material 12 having different configurations on the respective faces. On rear face 13 the conducting layer is applied uniformly over the board except in circular areas 15 which surround each of the apertures 10 and 11. However, on front face 14, the conducting material is applied to circular areas 16 which are adjacent to apertures 11 and to strips 17 connecting areas 16 in a series of columns and in addition across the remaining portion of front face 14 except in the circular areas 15 which surround apertures 10 and the areas 18 which are contiguous with strips 17 and circular areas 16. The configuration, then, on front face 14 is one of a series of columns of conducting strips connecting apertures 11 but separated from the conductive material on the remaining portions of the board. On front face 13, the configuration is one of a plurality of rows of circular areas surrounding apertures 10 and 11 and arranged in alternate offset columns in the thin layer of conducting material. Each configuration may be applied to circuit board 2 with any standard method used in printed circuitry.

Contact elements 3 are inserted through each of apertures 10 and 11 to extend outwardly from rear face 13 of printed board 2. Each of contact elements 3 is provided with a shoulder 33 to abut rear face 13 and head 34 is formed after the insertion of the element to ring stake the element to board 2. The undersides of contact heads 34 of the elements in apertures 11 are soldered to conducting areas 16 on front face 14 in a manner such that the outward surfaces of the contact heads are free of solder. Printed board 2 is then mounted within frame 20 which is of a conductive material and is provided with mounting flanges 31 to which board 2 is secured by standard machine screws. Coupling jacks 28 are inserted through the side walls of frame 20 and secured thereto by nuts 30, jacks 28 being aligned with the rows of contact elements mounted in apertures 10. Coupling jacks 29 are similarly inserted through one end of frame 20 in alignment with the contact elements in the columns formed by apertures 11. Cover plate 6 which is of a conductive material is mounted over the rear of frame assembly 1.

A series of channel-shaped shields 21 is mounted on board 2 with webs 25 disposed in engagement with the conductive material on face 13 in alignment with the alternate rows of apertures 10. Webs 25 are provided with openings 26 to receive contact element 3. Shields 21 are of a conductive material and are provided with flanges extending from webs 25 between the rows of the contact elements from the board toward the rear of frame 20. Shields 36 are provided over those particular contact elements 3 which reside in columns of apertures 11 and which are adjacent to the ends of coupling jacks 29, these contact elements being wired to the terminal ends of coupling jacks 29. The terminal ends of jacks 29 are also shielded by shields 36.

The arrangement of coupling jacks 28 in the side walls of frame 20 is such that the jacks in one wall are aligned with every other row of apertures 11 and the jacks in the other side wall are aligned with the alternate rows of apertures 11. The contact elements in these rows are then connected together by conductors 27 extending between the flanges of shields 21 to connect with the terminal ends of coupling jacks 28. The terminal ends of jacks 28 are also shielded by shields 21.

Attached to the frame assembly 1 is plate assembly 4 in such a manner that contact heads 34 of contact elements 3 are exposed to plungers 5 mounted on plate 40. Plate 40 is provided with a plurality of apertures 41 (88 in number) arranged in 11 rows of eight apertures to each row. Each aperture 41 is so disposed in plate 40 as to lie over a direct line connecting an aperture 10 with an aperture 11 which lies directly to the right and slightly above said aperture 10 as viewed in front face 14 of printed board 2. In each aperture 41 of plate 40, there is mounted a cylindrical plunger housing 43 having a reduced portion 45 which is inserted through aperture 41 with flange 46 staked over to secure the housing to plate 40. In each of housings 43, a plunger 5 is inserted and biased outwardly away from plate 40 and frame assembly 1 by spring 49. The inward end of plunger 5 is provided with a pair of contact members 50 extending inwardly towards frame assembly 1 to engage the respective pair of contact element heads mounted in the respective apertures 10 and 11 of printed board 2, as described above, when plunger 5 is depressed against the biasing action of spring 49. To retain plunger 5 against the outward bias of spring 49 and to ground the plunger contacts 50 when plunger 5 is retracted, ground contacts **50*a* are secured to the inward end of plunger 5 for engagement with staked flange 46 of housing 43. Roll pin 47 is secured to the outward end of plunger 5 for engagement with longitudinal slot 44 in housing 43 to prevent rotation of the plunger and thus of the plunger contact members 50. Plate 40 is secured to frame assembly 1** by standard machine screws.

Switch assembly 7 is mounted over plate assembly 4 and is supported in this position by an appropriate number of spacing supports 51. Switch assembly 7 includes a switch plate 8 secured to supports 51 and switch plate 8 is provided with a plurality of apertures 70 arranged in eleven rows of eight apertures each and disposed in alignment with plunger apertures 41 in plate 40 of plate assembly 4.

For each of plungers 5, there is provided a plunger actuating knob 9 having a plunger contacting stem 68 which is inserted through an aperture 70 in switch plate 8. To guide stem 68 towards its respective plunger 5, a plurality of switch sub-assemblies 60, one for each column of plungers, are mounted beneath and secured to switch plate 8. Each switch sub-assembly includes an upper support 61 and a lower support 62 between which are mounted a plurality of guide sleeves 63, one for the stem 68 of each plunger actuating knob 9.

As shown in the drawings, each plunger actuating knob 9 has a face 69 upon which an appropriate marking may be inscribed to designate the respective knobs and the corresponding plungers 5.

In operation, each of the coupling jacks 28 may be connected to a different frequency source and each of the coupling jacks 29 in turn may be connected to a different circuit for which a frequency is to be provided, there being eight different frequency outlets for which eleven different frequencies may be supplied. When a given frequency is desired to be supplied to one of the eight outlets, the respective plunger actuating knob 9 is depressed to in turn engage and depress the respective plunger 5 bringing the plunger contact members 50 into engagement with the contact head of contact element 3 in the row corresponding to the frequency desired and the contact head in the respective column corresponding to the outlet to which the frequency is to be supplied. Since the conductors 27 are effectively shielded from one another by shields 21 and also shielded from contact strips 17 on the front face of printed board 2, interference between the respective frequency conductors is eliminated. This latter shielding is provided by the layers of conducting material 12 on both rear face 13 and front face 14 of printed board 2.

Each of the coupling jacks 28 may be connected to its respective frequency source through an appropriate frequency filter so that if a combination of frequencies is desired for a given outlet jack 29, the plunger actuating knobs corresponding to the respective frequencies and lying in the column corresponding to the particular outlet jack 29 may be depressed to switch the desired frequencies to this particular outlet jack.

While I have disclosed but one embodiment of my invention, it will be apparent to those skilled in the art that various modifications may be made without departing from the scope of the invention.

What is claimed is:

1. A multiple key switchboard for high frequency potentials comprising a housing, a contact board supported within said housing carrying a plurality of rows of spaced contact elements arranged in alternately offset columns, said contact elements in said alternate columns being connected together on one side of said board, a series of channel-shaped shields disposed on the other side of said board in alignment with the alternate rows of contact elements other than those in said alternate columns, said shields being formed with apertures in the base of the channel accommodating the contact elements in said alternate rows, a conductor extending along each of said channels and connected to the terminals in the channels, first couplings extending through ends of the housing and respectively connected to the contact element in each of the alternate columns, second couplings extending through sides of the housing and connected respectively to said conductors, a plate on said housing overlying said one face of said board, a plurality of plungers extending through said apertures in said plate and slidably mounted for movement toward and from said board, said plungers being arranged in rows and columns disposed between pairs of the rows and columns of contact elements, contact members extending radially from one end of each of said plungers overlying a contact in one of said alternate columns and a contact in one of said alternate rows to engage and connect them together when the plungers are moved toward said board for connecting a selected one of said first terminals to a selected one of said second terminals, and means on the plungers preventing rotation relative to said plate, said contact members being grounded to said plate and said housing when the plungers are moved away from said board by said spring means.

2. A multiple key switchboard for high frequency potentials comprising a housing, a contact board of dielectric material supported within said housing formed with a plurality of rows of spaced apertures arranged in alternately offset columns, said board having conductive material overlying both faces except in the area surrounding said apertures and along the edges of strips on one face extending between the apertures in said alternate offset columns, contact elements extending through said apertures and secured to said board with contact surfaces exposed on said one face and terminals projecting beyond the other face spaced from the conductive material on the faces of the board, said contact elements in said alternate columns being connected together by said strips, a series of channel-shaped shields disposed in engagement with the conductive material on said other face in alignment with the alternate rows of contact elements other than those in said alternate columns, said shields being formed with apertures in the base of the channel accommodating the terminals on the contacts in said alternate rows, a conductor extending along each of said channels and connected to the terminals in the channels, a plate on said housing overlying said one face of said board, a plurality of plungers and contact members extending from one end of each of said plungers overlying a contact in one of said alternate columns and a contact in one of said alternate rows to engage and connect them together when the plungers are moved toward said board.

3. A multiple key switchboard for high frequency potentials comprising a housing, a contact board of dielectric material supported within said housing formed with a plurality of rows of spaced apertures arranged in alternately offset columns, said board having conductive material overlying both faces except in the area surrounding said apertures and along the edges of strips on one face extending between the apertures in said alternate offset columns, contact elements extending through said apertures and secured to said board with contact surfaces exposed on said one face and terminals projecting beyond the other face spaced from the conductive material on the faces of the board, said contact elements in said alternate columns being connected together by said strips, a series of channel-shaped shields disposed in engagement with the conductive material on said other face in alignment with the alternate rows of contact elements other than those in said alternate columns, said shields being formed with apertures in the base of the channel accommodating the terminals on the contacts in said alternate rows, a conductor extending along each of said channels and connected to the terminals in the channels, first couplings respectively connected to the contacts in each of the alternate columns, second couplings connected respectively to said conductors, a plurality of plungers slidably mounted for movement toward and from said board and contact members extending from said plungers overlying a contact in one of said alternate columns and a contact in one of said alternate rows to engage and connect them together when the plungers are moved toward said board for connecting a selected one of said first terminals to a selected one of said second terminals.

4. A multiple key switchboard for high frequency potentials comprising a housing, a contact board of dielectric material supported within said housing formed with a plurality of rows of spaced apertures arranged in alternately offset columns, said board having conductive material overlying both faces except in the area surrounding said apertures and along the edges of strips on one face extending between the apertures in said alternate offset columns, contact elements extending through said apertures and secured to said board with contact surfaces exposed on said one face and terminals projecting beyond the other face spaced from the conductive material on the faces of the board, said contact elements in said alternate columns being connected together by said strips, a series of channel-shaped shields disposed in engagement with the conductive material on said other face in alignment with the alternate rows of contact elements other than those in said alternate columns, said shields being formed with apertures in the base of the channel accommodating the terminals on the contacts in said alternate rows, a conductor extending along each of said channels and connected to the terminals in the channels, a plate on said housing overlying said one face of said board, a plurality of plungers extending through said apertures in said plate and slidably mounted for movement toward and from said board, said plungers being arranged in rows and columns disposed between pairs of the rows and columns of contact elements, contact members extending radially from one end of each of said plungers overlying a contact in one of said alternate columns and a contact in one of said alternate rows to engage and connect them together when the plungers are moved toward said board, and means on the plungers preventing rotation relative to said plate, said contact members being grounded to said plate and said housing when the plungers are moved away from said board by said spring means.

5. A multiple key switchboard for high frequency potentials comprising a housing of conductive material, a contact board of dielectric material supported within said housing formed with a plurality of rows of spaced apertures arranged in alternately offset columns, said board having conductive material overlying both faces except in the area surrounding said apertures and along the edges of strips of conductive material on one face extending between the apertures in said alternate offset columns, contact elements extending through said apertures and secured to said board with contact surfaces exposed on said one face and terminals projecting beyond the other face spaced from the conductive material on the faces of the board, said contact elements in said alternate columns being connected together by said strips, a series of channel-shaped shields having webs disposed in engagement with the conductive material on said other face in alignment with the alternate rows of contact elements other than those in said alternate columns and flanges extending between rows of contact elements from the board toward a wall of said housing, said shields being formed with apertures in the webs accommodating the terminals on the contacts in said alternate rows, conductors spaced from the flanges of each of said channels and connected to the terminals in the respective channels, first couplings extending through ends of the housing and respectively connected to the contacts in each of the alternate columns, second couplings extending through sides of the housing and connected respectively to said conductors, a cover plate of conductive material closing said housing over said one face of said board, a plurality of plungers extending through apertures in said plate and slidably mounted for movement toward and from said board, said plungers being arranged in rows and columns disposed between pairs of the rows and columns of contact elements, spring means normally urging said plungers away from said board, contact members extending radially from one end of each of said plungers overlying a contact in one of said alternate columns and a contact in one of said alternate rows to engage and connect them together when the plungers are moved toward said board for connecting a selected one of said first terminals to a selected one of said second terminals, and means on the plungers preventing rotation relative to said plate, said contact members being grounded to said plate and said housing when the plungers are moved away from said board by said spring means.

References Cited by the Examiner

UNITED STATES PATENTS

| | | | |
|---|---|---|---|
| 246,343 | 8/81 | Ross | 339—186 |
| 520,223 | 5/94 | Schneider | 200—1 |
| 572,748 | 12/96 | Fordyce | 317—112 |
| 1,050,328 | 1/13 | Arnhorst | 317—112 |
| 1,861,203 | 5/32 | Anders | 339—143 |
| 2,310,461 | 2/43 | Regan et al. | 200—1 |
| 2,468,737 | 5/49 | Davis | 339—143 |
| 2,505,813 | 5/50 | Toth | 174—35 |

FOREIGN PATENTS

| | | |
|---|---|---|
| 595,200 | 4/34 | Germany. |

BERNARD A. GILHEANY, *Primary Examiner.*

MAX L. LEVY, *Examiner.*